United States Patent [19]
Spraggins

[11] 3,711,036
[45] Jan. 16, 1973

[54] FISHING REEL
[76] Inventor: Thomas C. Spraggins, Star Route Box 41P, Destin, Fla. 32541
[22] Filed: Jan. 22, 1971
[21] Appl. No.: 108,714

[52] U.S. Cl. ............................................. 242/84.1 R
[51] Int. Cl. ............................................. A01k 89/00
[58] Field of Search ........ 242/84.1 R, 84.1 L, 84.2 R, 242/84.2 A, 84.21 R

[56] References Cited

UNITED STATES PATENTS 2,667,312  1/1954  Denison et al. ................... 242/84.2 A
2,731,756  1/1956  Nelson .......................... 242/84.2 R X
2,890,004  6/1959  Whitbeck ........................ 242/84.1 R Primary Examiner—Billy S. Taylor
Attorney—Jennings, Carter & Thompson

[57] ABSTRACT

A fishing reel adapted to be used as a holder for slack line ahead of the main reel. The reel comprises a line pick up bail designed, upon a tug on the bait at the end of the line, automatically to snap to a free running position relative to the spool, permitting line thereon to pay out.

3 Claims, 5 Drawing Figures

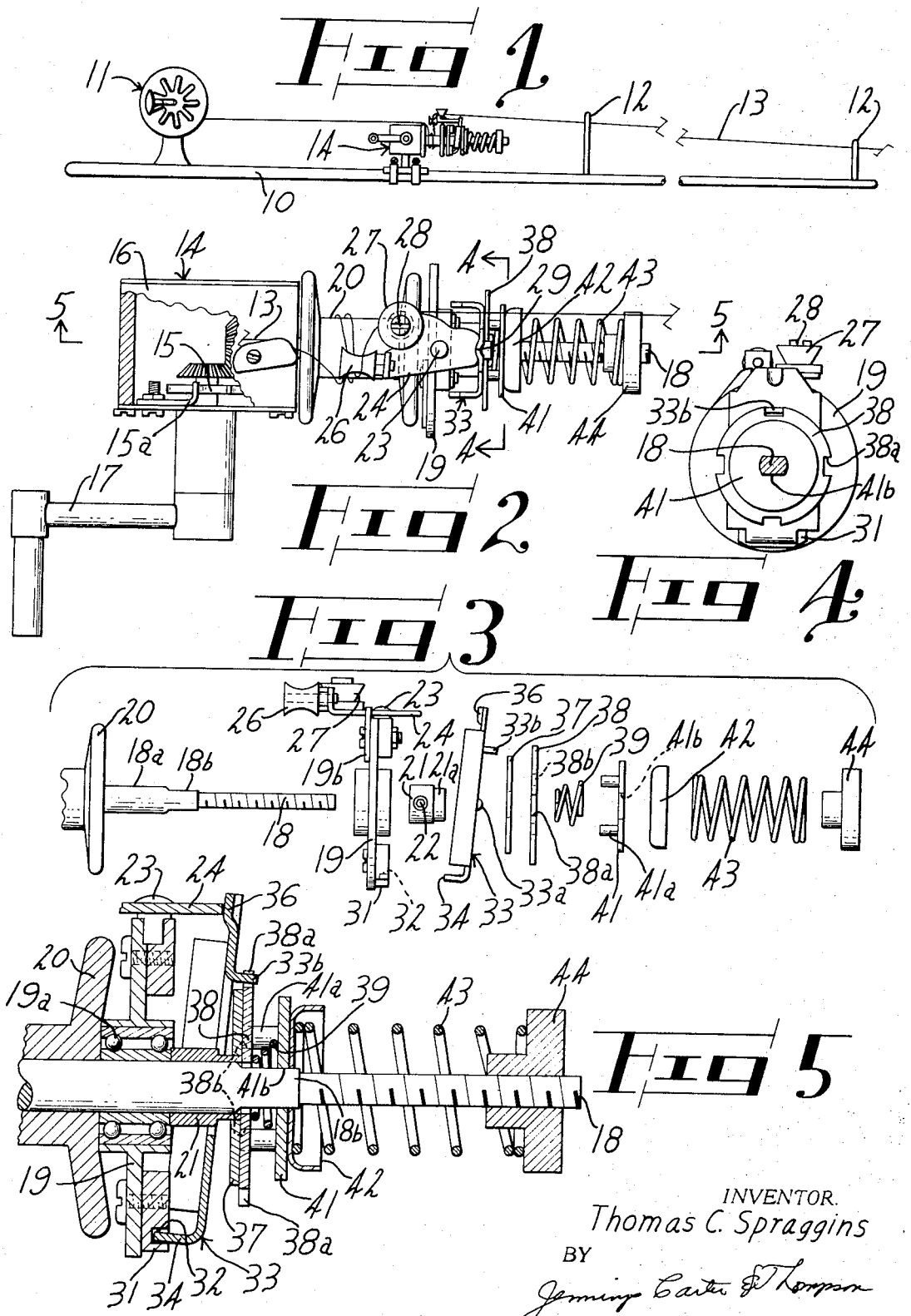

FISHING REEL

My invention relates to a slack reel, particularly adapted for deep sea fishing and for use in connection with a rod and a main fishing reel and has for an object the provision of a reel upon the spool of which may be wound sufficient line to afford the usual slack necessary to permit a game fish, upon initial strike, to slow the moving bait in the water, or to stop it altogether, depending upon the speed at which the trolling is being accomplished, so that the fish may circle and take the bait.

In deep sea fishing it is customary to provide rather long, socket held poles mounted on the rear of the trolling vessel. The line from the rod is passed up these poles and is held by a clip means so that the bait is trolled through the water with an opportunity for the existence of slack in the line when a fish strikes. As is known, a large number of game fish which are caught by trolling first hit the bait being trolled, and then circle to take the bait. The slack in the line is needed to permit the bait to act as if the striking fish actually had stunned the bait, simulating the natural feeding condition for such fish. The use of these long poles and the necessity for lowering them each time in order to reset the line is cumbersome and inconvenient.

My invention contemplates an auxiliary reel which may be carried on the rod just ahead of the main reel and on the spool of which there may be wound enough slack line to permit the line to pay out upon the initial strike of the fish, thus accomplishing the delay required to permit the fish being sought to take the bait.

My invention contemplates an auxiliary reel of the character designated which may have a crank operated spindle or shaft surrounding which and either freely mounted thereon or secured thereto is a spool. Associated with the spool is a line pick up bail and the bail may be operatively connected to the shaft so that when the handle is rotated the line in the bight between the main reel and the end of the rod is wound on the spool. The construction of the bail and detent mechanism of my improved reel is such that automatically upon the initial strike of the fish taking the bait, the bail snaps to a free running position, permitting the line to pay out from the spool of the auxiliary reel, affording the necessary slack as aforesaid. Spring means is provided to adjust the amount of pull necessary to release the bail.

In view of the foregoing an object of my invention is to provide an auxiliary reel of the character designated which will facilitate the provision of the necessary slack between the main reel and a bait being trolled through the water, and in which the line pick up bail is provided with an auxiliary, off set roller, constructed and arranged to effect automatic disengagement of the bail, when the fish makes its initial strike.

A reel illustrating features of my invention is shown in the accompanying drawings, forming a part of this application, in which:

FIG. 1 is a fragmental side elevational view of a deep sea fishing rod and reel with my improved auxiliary reel in place thereon;

FIG. 2 is an enlarged plan view of my improved reel, partly broken away and in section;

FIG. 3 is an exploded view of several of the parts of my improved reel;

FIG. 4 is a detail sectional view taken generally along line 4—4 of FIG. 2; and, FIG. 5 is an enlarged detail sectional view taken generally along line 5—5 of FIG. 2.

Referring now to the drawings for a better understanding of my invention I illustrate the same in association with a heavy duty fishing rod 10 which may carry at the rear or handle end the usual heavy duty fishing reel 11. The rod has the usual guides 12 through which the fishing line 13 passes from the reel 11 forwardly, over a guide on the top of reel 14 as seen in FIG. 2, through the end guide 12 and into the water, where it may carry a hook on which is placed an appropriate bait or lure, not shown, and which is used in trolling for game fish.

My improved reel is adapted for mounting on the rod just forwardly of the main reel 11 and is indicated generally in the drawings by the numeral 14. As best shown in the remaining views of the drawings, the reel 14 may comprise a body or case portion 16 in which there may be the usual gear train as shown, operated by a handle 17 to rotate a shaft or spindle 18. Means in the form of a ratchet 15 and a pawl 15a prevent the handle from rotating counterclockwise as viewed in FIG. 1.

Mounted on the spindle 18 is a line spool 20 and it is around this spool which a quantity of line between the reel 11 and the end of the rod is to be wound, as will appear.

Starting with the parts immediately forward of the front end of the spool 20, I first mount on an enlarged portion 18a of the shaft a disc 19 which carries at its center an anti-friction bearing 19a, such as a ball bearing. The disc 19 is held rotatably but against axial movement on the spindle 18 by means of a set collar 21 which has a counter-sunk securing screw 22 therein.

On the periphery of the disc 19 and pivoted at 23 is a bail plate 24. The plate 24 carries a line pick up roller 26 mounted for rotation on an axis generally parallel to the axis of the spool and, of course, parallel to the spindle 18. It will be noted from FIG. 2 that the line pick up roller 26 is offset to one side of the pivot point 23 for the plate 24.

A line guide roller 27 is pivotally mounted at 28 to the plate and rotatable on an axis generally normal to the longitudinal axis of the spool 18. Furthermore, the pivot for the roller 27 is offset laterally from the pivot point 23 and on the opposite side from roller 26. A stop plate 19b is secured to the rear side of plate 19 to prevent plate 24 from rotating counterclockwise.

It will also be noted that the plate 24 is provided at its forward end, that is, ahead of the pivot point 23, with a slight indentation or depression 29.

The disc 19 is provided opposite the plate 24 with a block 31 having a slot 32 cut therein. Loosely fitting about the spindle and the set collar 21 is a detent rock plate 33. The plate 33 has a rearwardly turned plate-like end portion 34 which is adapted to fit loosely in the slot 32. The opposite end of the plate 33 carries a detent 36 which is adapted to snap into and be held into the depression 29 in the plate 24, thus to lock the bail plate 24 in the position shown in FIG. 2, as will appear more in detail.

Next forwardly of the detent plate 33 is a washer 37 which is adapted to fit slidably around a reduced end portion 21a of the set collar 21 and is adapted to be held into contact with a pair of protuberances 33a on the forward side of the plate 33.

Next forwardly of the washer 37 is another washer 38 having a plurality of notches 38a in its periphery, and which is rotatably mounted on the spindle 18, just forward of the reduced end 21a of the set collar 21. Reverting again to the plate 33 it will be seen that there is a forwardly extending lip 33b and as will appear this lip is adapted to be engaged selectively in one of the notches 38a in the periphery of the washer 38.

Next forwardly of the washer 38 is a small compression spring 39.

Forwardly of the spring 39 is another washer 41 which has a plurality of rearwardly extending pins 41a, these pins being adapted to engage in openings 38b in the washer 38. Also, washer 41 is provided with a squared opening 41b at its center adapted to fit non-rotatably over a squared section 18b on the spindle 18 located just forwardly of the parts already described and just rearwardly of the threaded forward end of the spindle 18.

The assembly is completed by means of a cup washer 42, a compression spring 43 and a nut 44.

With the parts assembled as shown in FIG. 2 it will be seen that with the notch 29 engaged by the detent 36 on the plate 33, plate 33 being in position with its end 34 in slot 32, and the remaining parts being as shown in FIG. 2, turning handle 17 clockwise rotates the bail plate and hence the bail and the spool 20. With the line coming forwardly from the main reel 11 it is passed from the reel 11 downwardly onto the spool 10 as viewed in FIG. 2, upwardly under roller 26, laterally over and around the left side of roller 27 and thence forwardly to the end of the rod. In this position of the parts it will be seen that the washer 41, having its square section 41b engaged about the square section 18b locks the bail carrying washer 19 to the spindle because the prongs 41a enter the openings 38b of the washer 38 and because the lug 33b of plate 33 is engaged in one of the openings 38a in washer 38. Therefore, the connection with the parts in position as thus stated is between the recess 29 and the detent 36 of the plate 33.

With the line threaded as just illustrated, rotation of the handle 17 winds line on the spool 20 since the spool and bail are located in a bight of the line. The fisherman trolls with the rod in his hand in normal manner. Upon the occurrence of a strike it will be seen that a tug on the line forwardly of the roller 27 causes the entire plate 24 to pivot clockwise about its pivot 23 as shown in FIG. 2 due to the offset relation of roller 27 relative to the pivot point, freeing the bail carrying disc 19 for free rotation relative to all the other parts, permitting the line to pay out. The bail is freed because, when the roller carrying plate 24 rotates to release the detent 36 from notch 29, the plate 33 assumes a position substantially normal to the axis of the spindle 18. In moving from the angular position relative to the spindle to a position at right angles thereto the lip 33b is also removed from notch 38a in the periphery of plate 38. Since the plate 19 carrying the bail plate 24 and rollers is now free to rotate the other parts such as the washer 41 and its pins 41a remain engaged. By simply pivoting plate 24 about its pivot 23, plate 33 is pushed out at the top to re-engage the lip 34 in notch 32 and the detent 36 in the notch 29, again locking plate 33 to 38 which in turn is locked to washer 41 by the pins 41a, which in turn is locked to the spindle by the squared hole 41b therein fitting over the squared section 18b of the spindle. The amount of pull required to trip the bail may be determined by adjusting of spring 43 by nut 44.

While I have shown my invention in but one form, it will be obvious to those skilled in the art that it is not so limited, but is susceptible of various other changes and modifications without departing from the spirit thereof.

What I claim is:

1. In a fishing reel for paying out line upon initial strike of a fish, a support means, a shaft rotatably mounted on said support means,
   a. a handle operated drive means for rotating said shaft and line spool
   b. a line pick up bail mounted and releasably connected for rotation with the shaft, and
   c. latch means operatively interposed between the bail and shaft to disconnect the bail for rotation free from the shaft in response to a pull on the line, 2. A reel as defined in claim 1 in which the bail comprises a disc-like member mounted for free rotation on the shaft, a plate pivotally mounted on the periphery of the disc, a line pick up roller on the plate and journaled on an axis generally parallel to the axis of the spool and overlying the spool, a guide roller on the plate journaled on an axis generally normal to the spool axis and offset laterally relative to the pivot point of the plate, and said latch means including releasable detent means between the shaft and said plate, whereby with the detent means holding the bail secured to the shaft a pull on the line outwardly of the spool pivots the plate, releasing the detent means and permitting the bail to turn freely on the shaft, thereby releasing the line for paying out from the spool.

3. A reel as defined in claim 2 in which a spring holds the detent resiliently in contact with the plate, and means to vary the pressure exerted by the spring.

* * * * *